United States Patent [19]

Howell, Jr.

[11] 4,163,485

[45] Aug. 7, 1979

[54] CONDUCTING RAIL HANGER CONSTRUCTION

[76] Inventor: Alleyne C. Howell, Jr., 645 Mine Hill Rd., Fairfield, Conn. 06430

[21] Appl. No.: 882,143

[22] Filed: Feb. 28, 1978

[51] Int. Cl.² .............................................. B60M 1/20
[52] U.S. Cl. ........................................ 191/40; 191/32
[58] Field of Search ................... 191/40, 23 A, 32, 41, 191/42, 43, 44; 248/62, 63, 58, 71, 72; 174/40 R, 154; 24/259 R; 52/717

[56] References Cited

U.S. PATENT DOCUMENTS

| 2,657,442 | 11/1953 | Bedford, Jr. | 248/72 |
| 2,824,913 | 2/1958 | Taylor | 191/23 A |

FOREIGN PATENT DOCUMENTS

| 749473 | 12/1966 | Canada | 191/40 |
| 885765 | 12/1961 | United Kingdom | 191/40 |

*Primary Examiner*—Albert J. Makay
*Assistant Examiner*—Edmond G. Rishell, Jr.

*Attorney, Agent, or Firm*—H. Gibner Lehmann; K. Gibner Lehmann

[57] ABSTRACT

A conducting rail hanger construction comprising a conducting rail member, an insulating channel-like sheath jacketing the member and having portions extending along opposite sides thereof, and a spring clip also of channel-like configuration. The sheath has oppositely disposed longitudinal groove formations, each of the formations providing a pair of exterior facing shoulders. Leg portions of the clip extend into the groove formations of the sheath and engage the shoulders thereof. In addition, the leg portions have abutments providing sharp, cut edges which can bite into one shoulder of each pair to thereby prevent the sheath from pulling out under the action of an excessive transverse load or force applied to the rail. Broad surfaces on the leg portions limit the penetration of the cut edges into the sheath, thereby preventing distortion and destruction of the latter. Improved reliability and safer operation result, since there is eliminated loosening of the rail from the clip.

7 Claims, 6 Drawing Figures

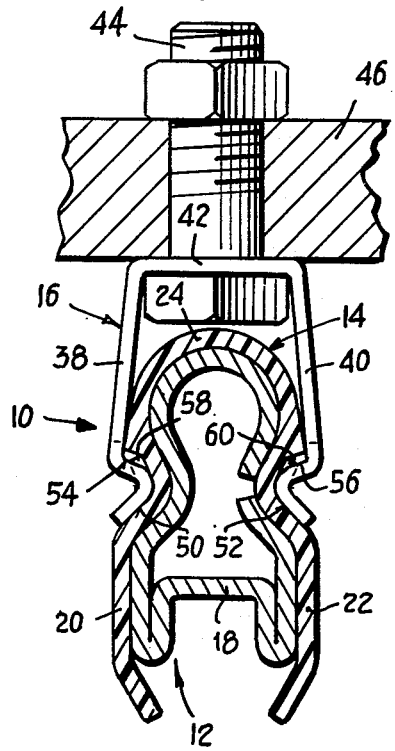
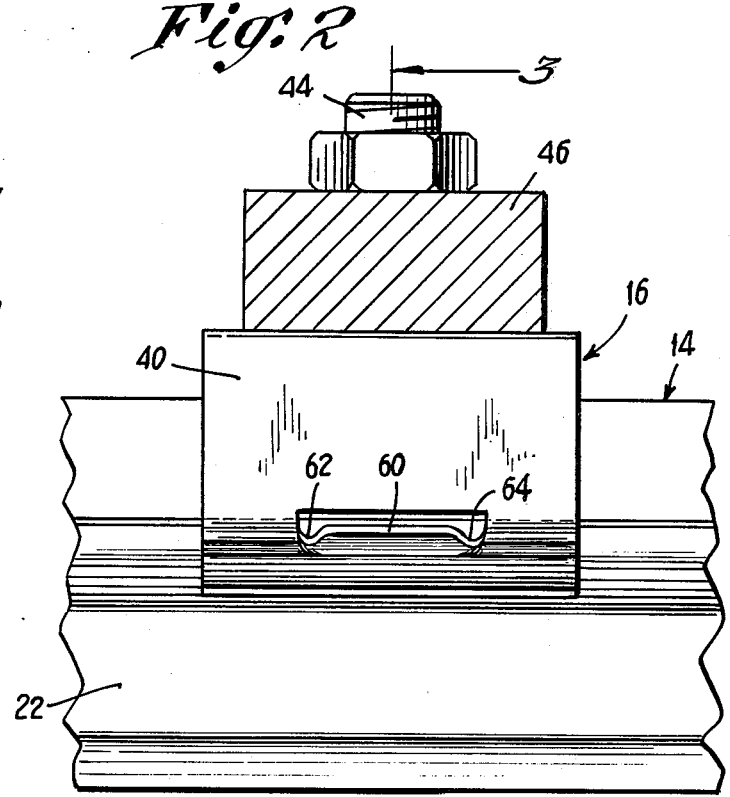
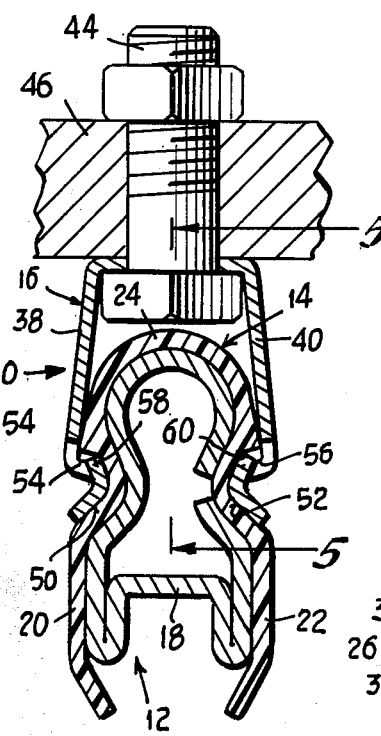
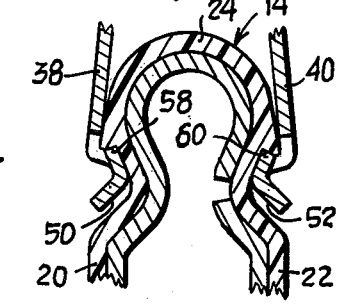
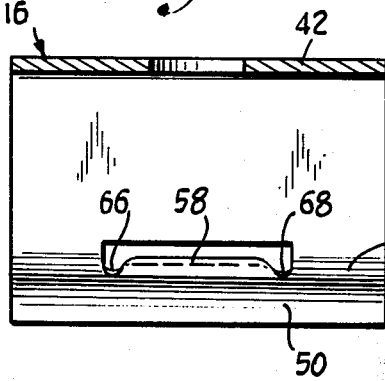
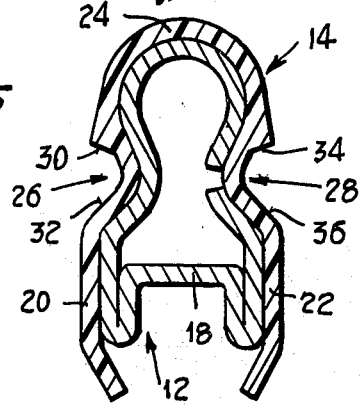

CONDUCTING RAIL HANGER CONSTRUCTION

BACKGROUND

This invention relates generally to power rail constructions of the type adapted to be engaged by a travelling collector shoe, and more particularly to hangers for rails intended to be suspended along a wall or ceiling, as by means of a series of resilient metal spring clips.

In the past, a number of different hangers for rail constructions have been proposed and produced, having met with varying degrees of success.

Hung rails are generally suspended from support beams in the ceiling of a building or manufacturing installation by means of a series of generally U-shaped spring clips having a pair of leg portions which extend on opposite sides of the rail and a connecting web portion which is apertured to receive one or more bolts, by which the clip is secured to the ceiling beam.

A number of different variations of hangers for this basic structure have been employed in an effort to reduce the overall cost of the parts, and to simplify assembly. One of the problems associated with virtually all prior constructions was that due to the high labor charges that currently prevail, the cost of installation sometimes exceeded the cost of the components being installed.

Conductor rails are generally supplied with a channel-like insulating plastic sheath extending around the rail along three sides, with the mouth of the channel providing clearance for the travelling collector shoe. In one prior construction, the sheath was provided with oppositely disposed longitudinal ribs; these ribs were engaged by corresponding support teeth on the legs of the spring clip hanger such that the sheath normally rested on the sharp edges or ends of the teeth. Several problems with this construction became apparent. After a period of use, the plastic of which the sheath was constituted aged and became somewhat brittle. There was thus a likelihood of breakage of the ribs of the sheath in the event that an excessive transverse load was applied to the rail. In addition, hum and vibration of the rail tended to cause stress or fatigue of such ribs, possibly leading to cold flow or breakage. It can be readily appreciated that there was to be avoided a failure of the support mechanism for such rails, due to potentially serious injuries suffered by plant personnel who were inadvertently struck by falling rail sections, and the resultant liability of the owners of the plant facility.

In many cases the support provided to the rail was inadequate. In the constructions noted above, twisting of the rail tended to occur, thus unseating one of the ribs of the sheath from its support tooth. Where the rail was allowed to twist, problems arose, resulting from improper alignment with the travelling collector shoe, causing either erratic operation or failure, or both. Also, in many constructions there were no counter supports acting against the (upward) pressure of the collector shoe as the latter passed the location of the spring clip. Accordingly, the pressure of the shoe on the rail could not be maintained at a uniform level. Moreover, the approach of a collector shoe could give rise to an undesirable twisting of the rail, as noted above.

In another prior construction, the hook formations on the legs of the spring clip were received in undercuts in the sheath, to support the latter (and rail) and prevent pull-out. However, in some cases the rail could twist to such an extent that the one hook formation would become un-latched from the corresponding undercut, thereby resulting in pull-out of the rail. As noted above, constructions wherein an inadvertent release of the rail could occur were not considered satisfactory from the standpoint of safety. Prior patents showing some of the features described above are listed as follows: U.S. Pat. Nos. 3,995,725; 2,640,114; 3,316,362; 4,016,961; and 3,300,593.

SUMMARY

The above disadvantages and drawbacks of prior hangers for rail installations are obviated by the present invention, which has for an object the provision of a novel and improved rail construction hanger which is both simple in its structure and reliable in operation.

Yet another object is the provision of a rail construction hanger as above, wherein the rail member is positively supported against inadvertent pull-out even after there occurs a limited aging or deterioration of the insulating sheath which jackets the member.

Still another object is the provision of a rail construction hanger wherein there is minimized tearing, gouging or inadvertent damage to the sheath, even over prolonged periods of use and under unfavorable conditions, thereby resulting in an installation having both excellent reliability and long life expectancy.

A still further object of the invention is the provision of a rail construction hanger wherein the rail can be readily installed with a minimum of time and effort and can be readily replaced should the need arise, without complex disassembly operations.

The above objects are accomplished by a rail and hanger construction comprising an elongate conducting rail member, an insulating sheath of channel-like cross section which jackets the member and which has portions extending on opposite sides thereof, and a spring clip of channel-like cross section. The sheath has oppositely disposed longitudinal groove formations, each providing a pair of facing shoulders, and the clip has a pair of leg portions extending into the groove formations for engagement with shoulders thereof. The leg portions have cut, sharp edges for biting engagement with one shoulder of each pair of shoulders, thereby preventing the rail member and sheath from pulling out of the spring clip under the action of an excessive transverse force applied to the member.

The arrangement is such that the sharp, cut edges of the legs of the clip bite into the sheath only when excessive load is exerted on the rail and to only a relatively shallow depth, just sufficient to prevent pull-out of the rail; yet there exist broad surfaces of engagement between the legs of the clip and the sheath at the location of the shoulders thereof, to prevent the sharp, cut edges on the clip from normally biting or penetrating into the sheath and possibly causing permanent damage thereto. A highly satisfactory support of the rail thereby results, yielding reliable operation over extended periods of use.

Other features and advantages will hereinafter appear.

In the drawings, illustrating a preferred embodiment of the invention:

FIG. 1 is a vertical section of the improved rail hanger of the present invention, and showing a rail member and insulating sheath carried thereby.

FIG. 2 is a front elevational view of the rail hanger and rail member of FIG. 1.

FIG. 3 is a section taken on line 3—3 of FIG. 2.

FIG. 4 is a fragmentary vertical section of the rail hanger and rail member, showing their relative positions when a large downward transverse load is applied to the latter.

FIG. 5 is a vertical section of the rail hanger.

FIG. 6 is a vertical section of the rail member and sheath per se, of FIG. 1.

Referring to the figures and in accordance with the present invention there is provided a novel and improved hanger construction for rail electrification systems, the rail and hanger being generally designated by the numeral 10, comprising a conducting rail member 12, an insulating sheath 14, and resilient spring clip 16. The member 12 has a slide contact surface 18 adapted to be engaged by a suitable collector shoe of usual construction (not shown).

The sheath 14 is constituted of suitable plastic or other insulating material, and jackets the rail member 12 as shown. Referring to FIG. 6, the sheath has a channel-like cross section, comprising a pair of legs 20, 22 and a connecting web 24. The legs 20, 22 have inwardly projecting groove formations 26, 28, providing pairs of adjacent facing shoulders 30, 32 and 34, 36.

The spring clip 16 is also of channel-like cross section, having a pair of legs 38, 40, and a connecting web 42. The latter is apertured to receive a mounting bolt 44 for securing the clip to a suitable beam or support 46.

The leg portions 38, 40 of the spring clip 16 each comprise divergent extremities providing shoulders 50, 52, and additional shoulders 54, 56, presently relatively broad surfaces for engagement with the cooperable shoulders 32, 36 and 30, 34 respectively. The shoulders 32, 50, and 36, 52 thus provide a detent to prevent the rail member 12 and sheath 14 from extending into the clip 16 past a predetermined point. In addition, the leg portions 38, 40 of the clip have cut, sharp edges in the form of abutments 58, 60 which are struck from the respective leg portions. The abutments 58, 60 are adapted for limited biting engagement with the shoulders 30, 34 of the sheath, to a relatively shallow depth with respect to the thickness thereof. During normal operation, with a nominal transverse force resulting from the weight of the rail applied to the sheath, limited biting of the edges 58, 60 into the latter occurs. In the event that a large downward load is applied to the rail, the penetration of the edges 58, 60 into the sheath occurs and is limited by the engagement of the broad surfaces 30, 54 and 34, 56. As a result, the depth to which such biting engagement progresses is controlled, thereby preventing destruction of the sheath due to excessive tearing or gouging. Such penetration of the edges into the sheath is shown in FIG. 4 wherein it is assumed that a large downward force is being applied to the rail member 12. Upon removal of the force, the penetration of the edges 58, 60 lessens. However, the initial penetration is sufficiently deep to prevent the sheath 14 (and rail member 12) from inadvertently being released from the clip. The positive retention provided by a biting engagement is thus retained, without danger of destruction of the sheath, or deformation thereof due to cold flow, cracking, etc. It can be appreciated that such an advantage is important from the standpoint of both safety against pull-out, and reliability. Since the clip is normally at ground potential electrically and the rail member is at a potential of hundreds of volts, maintaining the integrity of the sheath insulation is considered to be essential, even under the most adverse or extreme conditions of use.

Referring to FIG. 2 and further in accordance with the invention, the abutment 60 has rounded ends 62, 64 at its junction with the shoulder 56. Similar rounded ends are provided on the abutment 58 and are shown in FIG. 5, designated by the numerals 66 and 68. Such rounded ends provide four smooth surfaces for engagement with the legs 20, 22 of the sheath. In the event that the rail member 12 (and sheath 14) undergo expansion or contraction due to temperature changes, the relatively soft sheath can slide along the spring clip 16 without the abutments 58, 60 of the clip tearing into it. By the present arrangement there is thus minimized undesirable deterioration of the sheath; accordingly its integrity can be maintained even over extended periods of use.

Installation of the rail and sheath can be readily effected, since the shoulders 50 and 52 of the spring clip constitute camming surfaces which effect spreading of the legs 38, 40 when they first engage the sheath 14. In the assembled position the weight of the rail member (and sheath) is carried mostly by the shoulders 54, 56; in the event that a larger load is encountered, as during installation, or under shock, vibration etc., the cut edges or abutments 58, 60 bite into the sheath, as previously stated, to an extent to prevent pull-out, as in FIG. 4. In addition, the engagement of the shoulders 32, 50 and 36, 52 acts against the upward thrust of the collector shoe (not shown) which bears against the surface 18. Accordingly any tendency of the rail to twist and become misaligned is greatly minimized. Should the need ever arise, the rail member and sheath can be readily released from the clip by merely spreading the legs of the latter. Under normal circumstances, the penetration of the abutments 58, 60 into the surface of the sheath is insufficient to interfere with such spreading movement.

The present arrangement thus effectively solves the problems of adequately supporting a jacketed rail member by means of a spring clip in such a way that the possibility of the member pulling loose is virtually eliminated, while the insulating qualities and integrity of the jacket are positively maintained, even over extended periods of use. The construction is thus seen to represent a distinct advance and improvement in the field of rail electrification systems.

Each and every one of the appended claims defines a distinct aspect of the invention separate from the others, and each claim is accordingly to be treated in this manner when the prior art devices are examined in any determination of novelty or validity.

Variations and modifications are possible without departing from the spirit of the invention, and certain portions of the inventive improvement may be used without others. 9n

I claim:

1. A rail construction, comprising in combination:
   (a) an elongate conducting rail member,
   (b) an insulating sheath of channel-like cross section, jacketing said rail member and having portions extending on opposite sides of said member,
   (c) said sheath having oppositely disposed longitudinal groove formations, each providing a pair of facing shoulders,
   (d) a spring clip of channel-like cross section,
   (e) said clip having a web portion, and a pair of leg portions extending downward from the web portion,
   (f) said leg portions at their extremities having detent formations received in said groove formations, respectively, said detent formations being provided with shoulders that form camming surfaces, said detent formations further having cut, sharp edges intermediate the longitudinal ends of each leg portion and facing upward toward the web portion of the clip, for biting engagement with one shoulder of each pair of shoulders of the sheath, said biting engagement preventing said sheath from pulling out of said spring clip under the action of a transverse force.

2. The invention as set forth in claim 1, wherein:
(a) said cut edges comprise abutments respectively struck from the leg portions,
(b) said abutments having rounded ends to permit limited relative sliding movement between the clip and the sheath, without said abutments tearing into the latter.

3. The invention as set forth in claim 1, wherein:
(a) each detent formation engages one shoulder of said pairs of facing shoulders, to prevent the sheath from extending into the clip past a predetermined point.

4. The invention as set forth in claim 1, wherein:
(a) each leg portion of the clip provides a broad surface engageable with one shoulder of each pair of shoulders of the sheath after a predetermined penetration of said cut edges into the sheath has occurred,
(b) the engagement of the broad surfaces of the clip and the sheath normally limiting any penetration and preventing destruction of the sheath.

5. The invention as set forth in claim 1, wherein:
(a) said cut edges comprise abutments respectively struck from the leg portions,
(b) said abutments having rounded ends to permit limited relative sliding movement between the clip and the sheath, without said abutments tearing into the latter,
(c) each leg portion of the clip providing a broad surface engageable with one shoulder of each pair of shoulders of the sheath after a predetermined penetration of said cut edges into the sheath has occurred,
(d) the engagement of the broad surfaces of the clip and the sheath limiting said penetration and preventing destruction of the sheath.

6. The invention as set forth in claim 1, wherein:
(a) said cut, sharp edges penetrate into the adjacent surfaces of the corresponding shoulders of the sheath under the application of said transverse force,
(b) the degree of penetration increasing, within limits, as the magnitude of the force is increased.

7. The invention as set forth in claim 6, wherein:
(a) the engagement of broad surfaces of the leg portions of the clip and adjacent broad shoulders of the sheath, limiting the degree said penetration, to thereby prevent permanent damage to the sheath.

* * * * *